Figure 1:
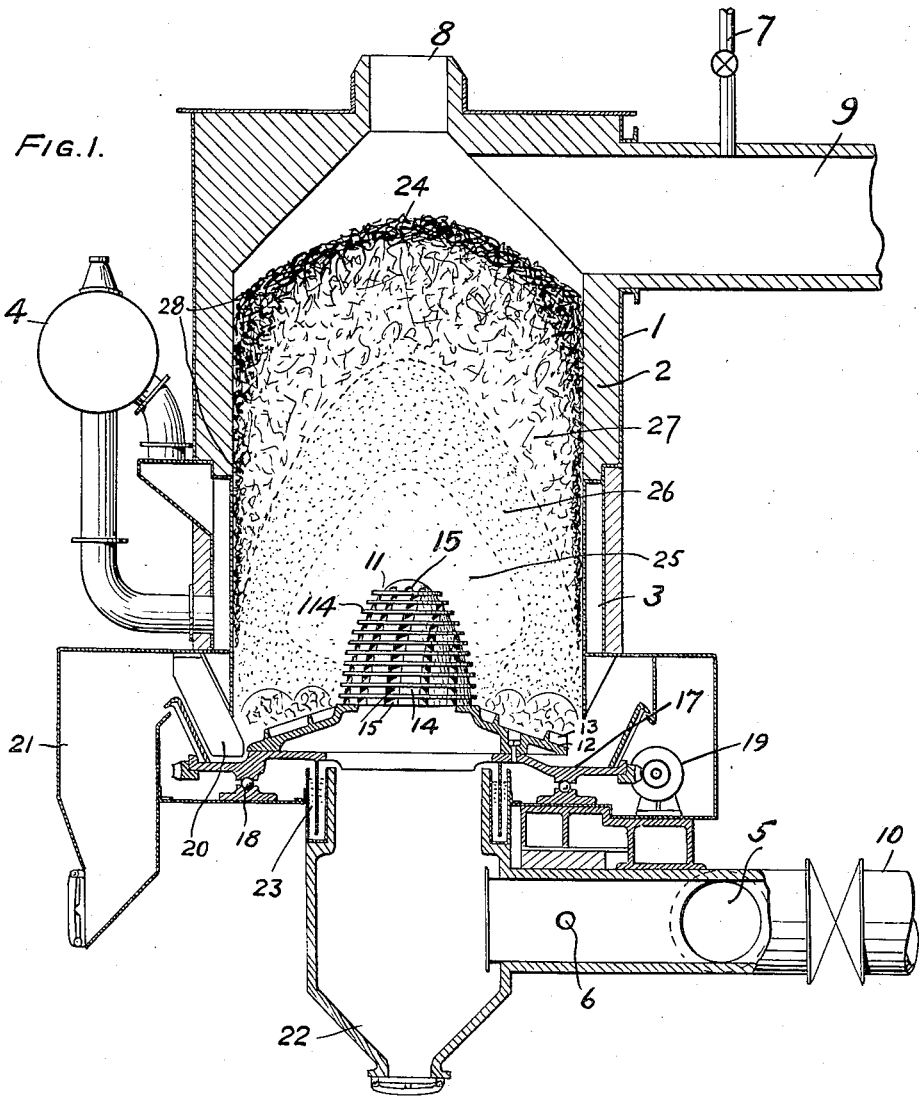

July 11, 1933.  J. S. HAUG  1,917,839
MECHANICAL GRATE FOR WATER GAS GENERATORS
Filed Dec. 7, 1928

WITNESS:

INVENTOR
John S. Haug
BY
Augustus G. Stoughton
ATTORNEY.

Patented July 11, 1933

1,917,839

UNITED STATES PATENT OFFICE

JOHN S. HAUG, OF PHILADELPHIA, PENNSYLVANIA, ASSIGNOR TO UNITED ENGINEERS & CONSTRUCTORS INC., OF PHILADELPHIA, PENNSYLVANIA, A CORPORATION OF DELAWARE

MECHANICAL GRATE FOR GAS GENERATORS

Application filed December 7, 1928. Serial No. 324,437.

The present invention relates to gas generators and more particularly to water gas generators in which the incandescent fuel bed is blasted alternately with air and steam and in which the steam blasting or "run" may be alternately from the bottom to the top and from the top to the bottom of the incandescent fuel bed.

The object of the invention is to provide an improved mechanical grate which will efficiently grind the clinker and eject the clinker and ash, and which will properly distribute the gas making fluids to the fuel bed and serve as a means for leading off the down run gas.

In the manufacture of water gas the fuel bed, during the air blasting period, is raised to a temperature sufficient to fuse the ash in the fuel, the entering air and steam then chill the base of the fuel bed and freeze the molten ash to clinker. The grate must grind up this clinker when it reaches the zone of operation of the grate and eject it from the fuel bed with the ashes. When the generator is lined throughout with refractory material, there is a continual tendency for the clinker to adhere to the wall and build outwards narrowing the fuel bed and hindering its uniform descent. This clinker does not reach the grate to be ground.

A wall surface in the lower part of the generator to which the clinker will not adhere is necessary. Thus far the practical surface has been some form of water cooled metallic jacket. With a water cooled jacket, however, some heat is abstracted from the fuel bed and although some of this heat may be recovered as steam if the necessary means are provided, it is desirable to limit this heat absorption as much as possible, at the same time protecting the metal from burning out.

This heat extraction can be reduced by reducing the amount of active combustion in the fuel lying close to the jacket wall.

There is a natural tendency for the gas making fluids to take such a path since the resistance along the smooth surface of the wall is lower than in the fuel bed proper. This is accentuated by the common and most convenient method of charging by means of a central charging door in the top of the generator. The central feed of the fuel has a tendency to concentrate the fines in the center, greatly increasing the resistance at that point, and the coarse lumps, having greater porosity, at the perimeter of the fuel bed. It also tends to give the fuel bed greater depth in the center. Although various means have been employed and proposed to correct this fuel distribution, with central feeding, they have not been entirely successful.

The common result has been that too large a proportion of the gas making fluids have gone up along the generator wall, with the attendant heat losses to jacket and tendency to form blowholes, and too little in the center. The periphery of the fuel bed has thus been over active and the center under active. This is undesirable with any form of fuel and especially so when bituminous fuel is used, in which case the coal in the center of the fire descends to the water gas reaction zone uncarbonized, and may even descend to the grate largely ungasified.

One of the features of my invention is the provision of means for introducing the gas making fluids in a manner which will correct the previous faulty distribution throughout the fuel bed, reduce the activity of combustion at the perimeter of the bed and make the central portion of the bed more active. This results in a more uniform gas production over the cross section of the fuel bed as a whole. This feature consists in means confining the introduction of the gas making fluids for up-blasting and up steaming to the central area of the fuel bed. These means consists of a central tuyère composed of stepped rings and provided with ports throughout its entire surface including the top. The ports for the introduction of the gas making fluids for up blasting and up steaming also according to my invention are made large and unrestricted so that they may serve for leading off the down run water gas without introducing back pressure.

Provision of ample area in the ports, substantially equal to or larger than the area of the opening in the bottom of the tuyère tends to prevent the objectionable velocity effect obtained in other forms of tuyères and permits of the passage of down run water gas, without giving rise to substantial back pressure in the generator.

This velocity effect which projects the blast toward the outer circumference is directly opposed to the object of this invention.

Another feature of my invention is the shape of the grate profile, by which the resistance to flow of gas making fluids is equalized in all parts of the fire. Thus in the center where the density of the fire is greatest, the depth of the fuel is least and consequently the path of the gas making fluids is shortest. The shape of the grate is such that as the porosity of the fuel increases toward the outer part of the fire, the path of the gas making fluids is proportionally increased. This also tends toward a uniform distribution of fluids and hence uniform gas making activity throughout the fire. Another feature of the invention is the combination with such means for the central introduction of air and steam, and for the unrestricted withdrawal of down run water gas, of clinker grinding and ash ejection means consisting of a low frustum of a cone extending outward from the first mentioned means to the perimeter of the fuel bed and provided with upstanding cutting ribs, and means for rotating the cone and tuyère.

These and other features will be described in connection with the attached figures, in which Figure 1 shows a vertical cross section of a water gas generator provided with the grate of my invention.

Figure 2:
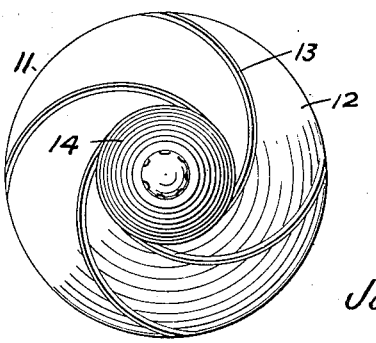

Fig. 2 shows a plan view of the grate and tuyère.

Referring to Figures 1 and 2: The temperature at the zone 25 is over 2700° to 2800° F. more or less. The temperature of the coolest zone may be 1000° to 1200° F. more or less. The temperature at the center of the fuel may not be given in degrees because it is ascertained by rodding.

The water gas generator shell is indicated at 1, 2 is the refractory lining, 3 is the water cooling jacket in the lower part of the generator, 4 is the steam drum—provided with connections to the jacket as indicated.

5 is the air blast supply, 6 the steam supply for up running, 7 the steam supply for down running, 8 is an inlet for fueling the generator and is shown centrally located. This fuel inlet is closed during gas making operations and is only open for recharging with fuel. 9 is an upper gas offtake, 10 is the bottom gas offtake.

11 generally indicates the grate of my invention, which is composed of the frustum of a cone 12 provided with the upstanding cutting ribs 13, which may be curved back opposite to the direction of rotation. The ribs are preferably inclined somewhat in the direction of rotation.

The grate is provided with the central tuyère 14, composed of superposed stepped rings 114 having projecting, spaced portions and furnished with the ports 15, leading into the fuel bed. These ports are provided throughout the entire surface of the tuyère. The combined area of these ports is equal to or greater than the area of the air blast supply pipe, permitting unrestricted passage of the gas making fluids into the fuel bed, and an unrestricted exit for down run water gas to the bottom offtake 10. For example, if the area of the upper opening in frustum of a cone 12 is one square foot the combined areas of the ports 15 will be one square foot or more.

In the generator chosen for illustration the grate is mounted on the ash pan 17 which rotates on the ball bearings 18 and is driven by the motor 19 through suitable gearing. A plow 20 removes the ashes from the ash pan into ash hoppers as 21. Ashes carried into the tuyère may be removed from hopper 22.

Sealing means as the water seal at 23 may be provided to prevent the gas making fluids from entering the fuel bed elsewhere than through the tuyère.

In operation, the fuel bed (generally indicated at 24) is blasted, the air passing through the tuyère 14 into the center of the fuel bed, the blast gases going off through 9.

When sufficient heat has been stored in the fuel bed, the air blast is shut off and steam is admitted to the base of the fuel bed from the supply 6, through the tuyère 14. The steam follows the path of the air blast gases through the incandescent bed 24 reacting with the fuel to form water gas which is taken off at 9. A down run may then be made, by steam admitted at 7 and passing down through the fuel bed, the resultant water gas passing into the tuyère to the offtake 10. The large port area of the tuyère offers little resistance to this passage.

The grate is rotated slowly. The cutting blades 13 on the grate, continually cut off the clinker at the base of the fuel bed and sweep the clinker and ash to the ash pan 17 at the periphery of the bottom of the fuel bed. The plow 20 removes the clinker and ashes to the ash pockets from which they may be removed for disposal.

The water cooling jacket prevents the adhesion of clinker to the walls in the zone of the fuel bed, which is at a high enough temperature to form clinker, at the periphery, so that all the clinker formed descends to be uniformly ground out by the grate.

Figure 1 indicates actual fire conditions in the lower half of the fuel bed of a generator employing the grate of my invention.

The zone indicated at 25 and lying in the center of the fuel bed, adjacent the tuyère is at the highest temperature, in zone indicated at 26, the fire is at a medium temperature, while in zone 27 it is lower and in zone 28 lower still.

The positions of these temperatures zones show that the tendency of the air blast to go up the wall in preference to the center has been overcome, in spite of central feeding of the fuel with no special means for distributing it on the top of fuel bed.

Practically all of the fuel will eventually descend through a zone of sufficiently elevated temperature for its gasification because the zones of high temperature spread outward at the base of the fuel bed.

The passage of the air blast is such that there is little active combustion alongside of the cooling surface, and a minimum amount of heat is abstracted from the fuel bed.

As a consequence of this method of distribution of the gas making fluids it will be seen that the depth of clinker adhesion zone of the fire near the periphery is much less than when the blast is admitted so that intense combustion takes place adjacent to the periphery. In the latter case, a comparatively deep clinker adhesion zone is formed due to the excessive steam activity of the fire. Excessive down-runs, to lower the clinker adhesion zone, are to be avoided. A high water jacket must be used extending above any point where there is danger of clinker adhesion. With my method it has been possible to work with a water jacket little more than half the height required by other forms of construction under the same operating conditions. It will be readily understood that the lower water jacket reduces heat losses and better maintains gas making activity in the fire. The design of the grate provides ample space for clinker accumulation below the level of air admission, and since there is no tendency for clinker to accumulate opposite the steep sides of the grate, there is assured an admission of gas making fluids through the opening directly to a clean fire, which tends to gas making efficiency.

The fire conditions shown in the figure are those of actual operation of my grate, and result in high efficiency and very high capacity.

The grate of my invention is shown in a generator which has been chosen for illustration, and which is subject to many possible variations and modifications as, for instance, the particular means of cooling the generator walls, the use of a wet or dry seal, the means employed to rotate the grate and so forth. Many such modifications may be made without departing from the spirit of my invention. The scope of my invention is only to be limited by the prior art and the appended claims.

The tuyère if, of paraboloid form, as shown, has the advantage that sufficient air passes through the ports of its upper portion for keeping it cool without passing air in excess through the ports of the lower portion, while at the same time the tuyère extends well up into the fuel bed.

It may be remarked that in all cases the rim portion of the grate need not be conoidal but in some cases may be flat because of the action of blades 13 which sweep the clinker and ash to the outer edge of the fuel bed whence they fall into the ash pan 17 from which they are removed by the plough 20.

I claim:

1. In combination, a water gas generator adapted to contain a fuel bed, a rotatable grate at the base of said generator, said rotatable grate including a tuyère mounted in the center of the grate and confined to substantially the central part of the generator as distinguished from its peripheral portion and an imperforate frustro-conical member having cutting bars on its upper surface and adjacent to and below said tuyère, means for introducing steam beneath said tuyère for up running through said fuel bed and for the withdrawal of the down run gas and for introducing air for blasting the fuel bed upwardly, means for introducing steam downwardly through the fuel bed, sealing means for rendering the bottom of the generator gas tight, said tuyère having ports therein having an aggregate area not less than the area of the air and steam blast supply and down run gas off-take means, and cooling means in the lower part of the side walls of the generator.

2. In combination a water gas generator daped to contain a fuel bed, means for supplying air and steam for blasting said fuel bed upwardly, means for down steaming the fuel bed and means for providing a shorter path for said blast through the center of said fuel bed than through the sides thereof, said means comprising a central rotary tuyère having a plurality of ports therein confined to the central area of the fuel bed with respect to its periphery to cause passage of gas in either direction as freely as possible and an imperforate outer portion attached thereto, and blades attached to said outer portion.

3. In a water gas generator adapted to contain a fuel bed, the combination of a water jacket arranged at the lower part of the generator, a rotary grate including a central tuyère having ports confined to substantially the central part of the generator as distinguished from its peripheral portion and a clinker grinding and ash ejecting base portion extending outward from the tuyère to the perimeter of the fuel bed and provided with upstanding cutting ribs said ports being arranged above said ribs, means for air and steam blasting upward through the ports of the tuyère including an opening provided at the base of the tuyère, and means for down steaming the fuel bed and for passing down run water gas through the ports of the tuyère and through said opening therein, the area of the ports in the tuyère being substantially equal to or larger than the area of said opening.

4. In a water gas generator adapted to contain a fuel bed, the combination of, a water jacket arranged at the lower part of the generator, a rotary grate including a central tuyère of substantially paraboloid form and composed of stepped and spaced rings and provided throughout its entire surface including its top with ports and having a clinker grinding and ash ejecting base portion extending outward from the tuyère to the perimeter of the fuel bed and provided with upstanding cutting ribs, means for air and steam blasting upward through the ports of the tuyère including an opening provided at the base of the tuyère, and means for down steaming the fuel bed and for passing down run water gas through the ports of the tuyère and through said opening therein, the area of the ports in the tuyère being substantially equal to or larger than the area of said opening.

5. In combination, a water gas generator having a chamber adapted to contain a fuel bed, a tuyère mounted for rotation in the chamber and having its ports substantially confined to the central part of the chamber as distinguished from its peripheral portion, an outwardly extending imperforate element surrounding the opening at the bottom of the tuyère and adapted to promote the passage of air and steam and down run water gas through the tuyère, an upstanding ash ejection member above the imperforate element said tuyère extending above and beyond the ash ejection member, means for withdrawing down run water gas through the tuyère and for supplying air and steam for blasting said fuel bed upwardly, means for admitting down run steam and for taking off up blast gas and up run water gas, and means for rotating the tuyère and ash ejection member.

6. In combination a water gas generator adapted to contain a fuel bed, means for supplying air and steam for blasting said fuel bed upwardly, means for supplying steam for down steaming the fuel bed, a grate structure including a tuyère mounted for rotation and having its ports substantially confined to the central part of the generator, as distinguished from its peripheral portion and an outer imperforate portion, an upstanding ash ejection member on said grate structure said tuyère extending above and beyond the ash ejection member, means for withdrawing down run water gas through the tuyère, offtake means for up blast and up run water gas, and means for rotating the grate structure.

7. In combination a water gas generator adapted to contain a fuel bed and having an inner wall including a metal part and a superposed part of refractory material, means for cooling said metal part, a tuyère mounted for rotation and having passages confined to substantially the central part of the generator as distinguished from its peripheral portion and having passages through it above the level of the lower edge of the metal part, and an outer imperforate element surrounding the tuyère, an upstanding ash ejection member above the imperforate element, said tuyère extending above and beyond the ash ejection member, means for withdrawing down run water gas through the tuyère and for supplying steam and air for up blasting said fuel bed, means for admitting down run steam for taking off up run blast gas and up run water gas, and means for rotating the tuyère and ash ejection member.

8. In combination a water gas generator adapted to contain a fuel bed, a tuyère having its ports confined substantially to the central part of the generator as distinguished from the peripheral portion, an outwardly extending imperforate element surrounding the opening at the bottom of the tuyère and adapted to promote the passage of air and steam and down run water gas through the tuyère, a rotatable and upstanding ash ejection member arranged above the imperforate element said tuyère extending above and beyond the ash ejection member, means for withdrawing down run water gas through the tuyère and for supplying air and steam for blasting fuel bed upwardly, means for admitting down run steam and for taking off up blast gas and up run water gas, and means for rotating the ash ejection member.

9. In a water gas generator adapted to contain a fuel bed, means for supplying air and steam for blasting said fuel bed upwardly, means for down steaming the fuel bed, a tuyère open at its bottom and having a steep perforated side wall projecting into and confined to the central part of the fuel chamber of the generator to create active fuel combustion adjacent the tuyère and spaced at its lower portion from the inner wall of the generator to confine active combustion away from the generator wall, an imperforate outer element arranged around the opening in the base of the tuyère to promote passage of down-run water gas and up-run air and steam blast through the tuyère, and mechanical means for grinding clinker and ejecting clinker and ash at the outer periphery of the generator, said tuyère projecting above and beyond said mechanical means.

10. In a water gas generator adapted to contain a fuel bed, means for supplying air and steam for blasting said fuel bed upwardly, means for down steaming the fuel bed, a tuyère open at its bottom and having a steep perforated side wall projecting into and confined to the central part of the fuel chamber of the generator to create active fuel combustion adjacent the tuyère and spaced at its lower portion from the inner wall of the generator to confine active combustion away from the generator wall, an imperforate outer element arranged around the opening in the base of the tuyère to promote passage of down-run water gas and up-run air and steam blast through the tuyère, means for opposing adhesion of clinker to the wall of the generator, and mechanical means for grinding clinker and ejecting clinker and ash at the outer periphery of the generator, said tuyère projecting above and beyond said mechanical means.

11. In a water gas generator containing an ignited fuel bed, a mechanical self-clinkering grate having air and steam inlet means thereto including, in combination, an outer member having a central opening therein and an outer imperforate portion, blades attached to the upper surface of said member, a tuyère attached to said member and extending upwards with steeply rising sides and having an opening in its bottom corresponding to the opening in the said imperforate member and having ports or openings throughout its vertical height, the diameter of the tuyère being sufficiently small in relation to the diameter of the generator to permit a portion of the active fire zone in the fuel bed to be located between the tuyère and the side of the generator, and the lowest port in the tuyère being sufficiently high so that the air and steam passing through the tuyère will pass through the lower portion of the fire zone before it encounters the walls of the generator.

12. In combination, a water gas generator having a chamber adapted to contain a fuel bed, peripherally discharging rotatable upstanding ash ejection means, a tuyère structure projecting into the chamber and extending upwards therein above and beyond said ejection means and confined substantially to the central part of the chamber as distinguished from its peripheral portion, means for confining the introduction of air and steam and the offtake of the down run water gas to the tuyère, means for withdrawing down run water gas and for supplying air and steam upwardly, means for admitting down run steam and for taking off blast gas and up run water gas, and means for rotating the ash ejection means.

13. In combination, a water gas generator having a chamber adapted to contain a fuel bed and closed at its bottom, a rotary ash ejector above the bottom of the chamber, a tuyère projecting through the bottom of the chamber above the ash ejector, the wall of the tuyère being spaced from the wall of the generator and extended into the generator, the space between the generator and tuyère walls and the extension of the tuyère into the generator adapted to interpose substantially the same fuel resistance to the flow of gases by way of the wall of the generator as is provided through the center of the fuel bed, means for passing air and steam upwardly through the tuyère, means for withdrawing down run water gas through the tuyère, means for introducing steam to the top of the chamber, means for withdrawing water gas from the top of the chamber, and means for rotating the ash ejector.

JOHN S. HAUG.